T. MIDGLEY.
PAPER WRAPPING MACHINE FOR TIRES.
APPLICATION FILED JULY 17, 1913.
1,238,318.
Patented Aug. 28, 1917.
3 SHEETS—SHEET 1.
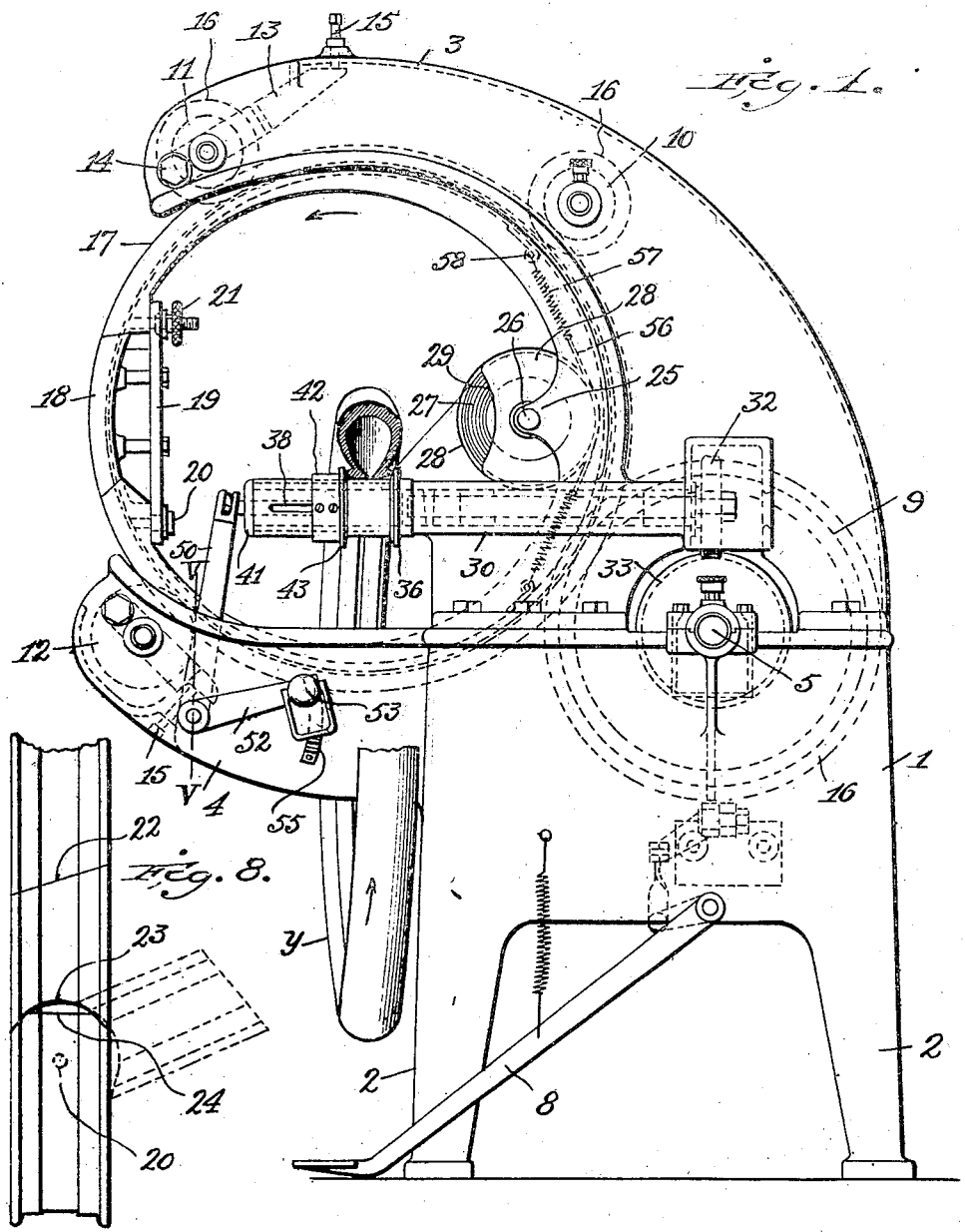

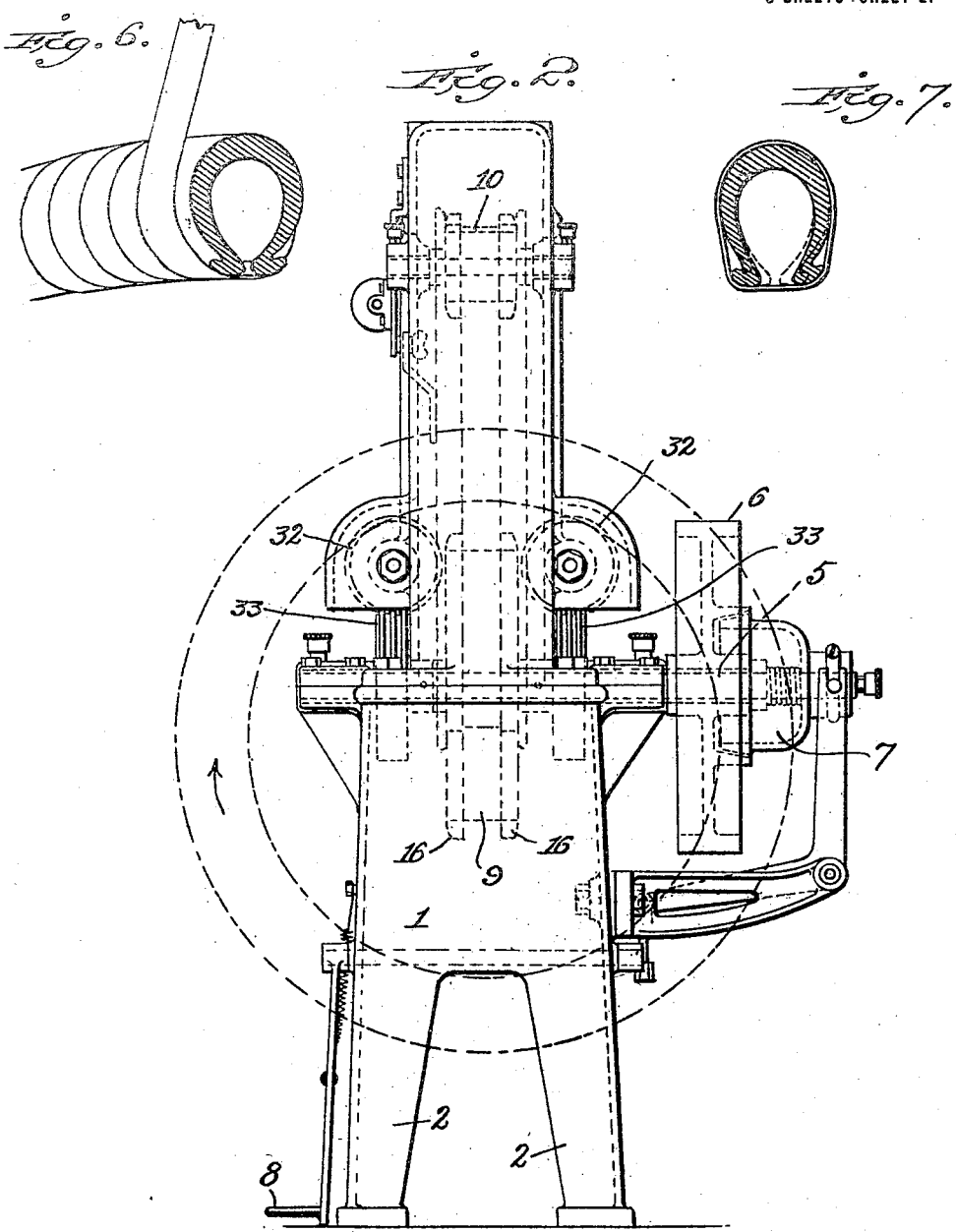

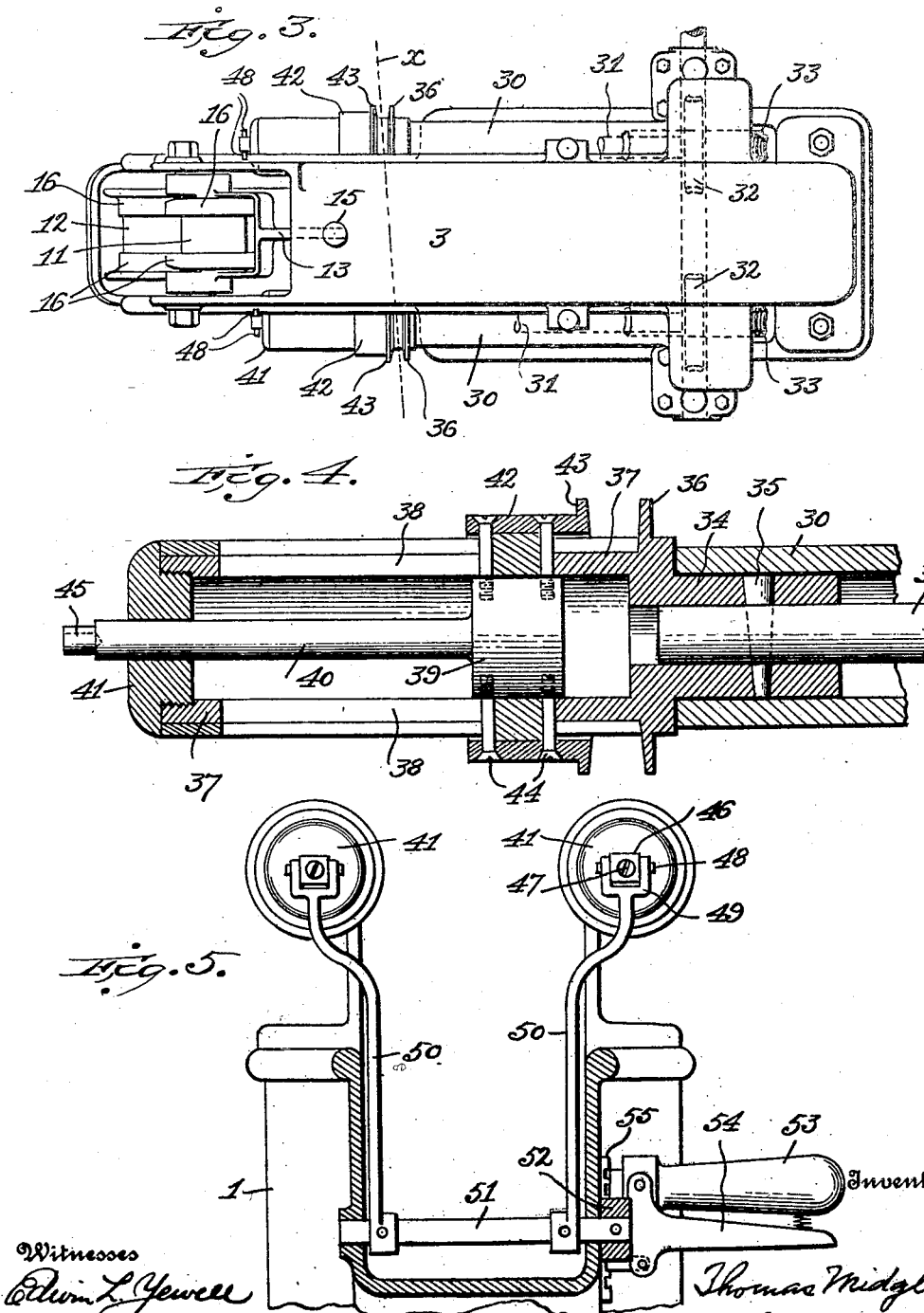

UNITED STATES PATENT OFFICE.

THOMAS MIDGLEY, OF WORTHINGTON, OHIO, ASSIGNOR TO MORGAN & WRIGHT, OF DETROIT, MICHIGAN, A CORPORATION OF MICHIGAN.

PAPER-WRAPPING MACHINE FOR TIRES.

1,238,318. Specification of Letters Patent. Patented Aug. 28, 1917.

Application filed July 17, 1913. Serial No. 779,641.

*To all whom it may concern:*

Be it known that I, THOMAS MIDGLEY, a citizen of the United States, residing at Worthington, in the county of Franklin and State of Ohio, have invented certain new and useful Improvements in Paper-Wrapping Machines for Tires; and I do hereby declare the following to be a full, clear, and exact description of the invention, such as will enable others skilled in the art to which it appertains to make and use the same.

My invention relates to machines for wrapping tire shoes and similar articles, and is designed particularly with a view to wrapping the finished tire shoe with paper in such manner that the paper shall be disposed thereon in a spiral wrapping and in a taut condition.

In accomplishing this result I have devised the improved mechanism hereinafter described and claimed, reference being had to the accompanying drawings in which:

Figure 1 is a side elevation of my improved machine, a tire shoe being shown therein partly broken away, said shoe being in the act of being wrapped.

Fig. 2 is a rear elevation of the machine, a tire shoe being shown in position in dotted outline.

Fig. 3 is a top plan view of the machine.

Fig. 4 is an enlarged detail longitudinal sectional view of one of the tire shoe gripping mechanisms.

Fig. 5 is an enlarged detail sectional view, taken on the line V—V, Fig. 1.

Fig. 6 is a detail perspective of a tire shoe in the act of being wrapped.

Fig. 7 is a transverse sectional view of a wrapped tire shoe, the contracted position of the beads of which is shown in dotted lines.

Fig. 8 is an enlarged detail front elevation of the gate in the rotating shuttle.

Similar numerals of reference denote corresponding parts in the several views.

In the said drawings the reference numeral 1 denotes the frame of the machine, the same having suitable supporting legs 2, and at its upper portion being formed into two curved jaws 3 and 4, the same producing a substantially circular open portion transversely of the machine, adapted to receive the shuttle hereinafter to be described.

Mounted to rotate freely on transverse shaft 5 is a drive pulley 6, the power from which may be applied to shaft 5 through the friction clutch 7 splined to shaft 5 and operable through the foot treadle 8 and its connections, as will be understood. Fixed to rotate with said shaft 5 centrally of the machine is a friction wheel 9, while disposed in the jaw 3 is a smaller idler wheel 10, and in the ends of said jaws 3 and 4 the similar idler wheels 11 and 12, the shafts of said latter wheels being mounted in bars 13 pivoted at 14 and controlled as to their free ends by set-screws 15, whereby said wheels 11 and 12 are made adjustable. Said wheels 9, 10, 11 and 12 have their surfaces provided with rubber friction strips 16, and are adapted to receive and support rotatably a shuttle 17, the same being in the form of a ring, as shown. Said shuttle is formed with a gate 18, the back bar 19 of which is pivoted at 20 in the shuttle 17 so that said gate may be swung on said pivot sidewise when the locking screw 21 is unscrewed. To permit this movement of the gate 18 the upper edge of the same is cut diagonally, as shown at 22 in Fig. 8, while the lower edge 23 is cut substantially on the arc of a circle struck from the pivot 20, the abutting face of the ring shuttle 17 being cut away at 24 to permit this movement. On the inner side of the shuttle 17 opposite the gate 18 are formed bearings 25 adapted to removably receive the spool 26 of a roll of paper 27, suitable guide disks 28 being provided, one of which is cut away at 29 to permit the free withdrawal of the paper, as will be hereinafter more particularly described.

Disposed in parallel horizontal sleeves or bearings 30, fixed to the frame 1 are the shafts 31, each having fixed to its inner end a worm gear 32 in mesh with a worm 33 keyed to shaft 5. As seen in detail in Fig. 4, each shaft 31 is connected to a sleeve 34 by means of a key 35, said sleeve having formed integral therewith a flange 36, and being enlarged beyond said flange at 37, and slotted at 38. Disposed within and longitudinally movable in each of said enlarged portions 37 is a plunger 39 having a shaft 40 projecting through a plug 41 at the outer end of enlarged portion 37. Attached to each plunger 39 is a ring 42 having formed thereon a flange 43, said attachment being accomplished through screws 44 passing through said ring 42 and into plunger 39 and lying in the slots 38, so that all of said parts will rotate with shaft 31. The said flanges 36 and 43 are complemental, and, as shown by the dotted lines *x* in Fig. 3, are disposed one pair slightly in front of the other, for a purpose hereinafter to be described. Mounted on the reduced outer end 45 of each shaft 40 is a block 46 held in position by a screw 47 but free to turn independently of shaft 40. Each of said blocks 46 is provided with trunnions 48 with which is engaged the bifurcated end 49 of a lever 50, said levers 50 being in turn fixed to a common shaft 51 mounted in the frame 1, and having fixed to one end a lever 52 carrying a handle 53 and a spring pressed locking lever 54 which engages with a rack 55 to lock said lever in any adjusted position.

Disposed within the shuttle 17 in position to exert a frictional contact with the spool of paper 27 is a band 56 acting as a brake thereon, said band being yieldingly held in operative position by the springs 57 hooked at their outer ends at 58 to the inner face of shuttle 17.

In operation the shuttle 17, which is disposed as shown within the frame 1 so as to rest on and be supported and guided by the large driven friction wheel 9 and the smaller idler wheels 10, 11 and 12, will be rotated by the rotation of said friction wheel 9, the rubber friction strips or bands 16 thereon, upon which the periphery of shuttle 17 rests directly, affording the necessary grip, the similar rubber strips 16 on the wheels 10, 11 and 12, upon which the periphery of said shuttle also rests, affording a sufficiently resilient bearing for said shuttle. But before imparting motion from drive pulley 6 to shaft 5 and thence to pulley 9, and while the machine is at rest, the gate 18 is opened, by unscrewing locking screw 21 and swinging said gate on its pivot 20 to the dotted line position shown in Fig. 8. The tire shoe *y* to be wrapped is then passed through said open gate and onto the enlarged portions 37 of the sleeves 30 between the flanges 36 and 43, as shown in Fig. 1. While said tire shoe is being inserted the movable rings 42 carrying the outer flanges 43 are disposed to their outermost position, through the lifting of the handle 53, but when said tire shoe is in position between said flanges 36 and 43, said flanges 43 are moved inward by depressing handle 53 until the beads of said tire shoe are forced as close together as possible or to the position shown in dotted lines in Fig. 7. The gate 18 is then swung to closed position and locked by screwing up locking screw 21, which causes the shuttle 17 to present an unbroken periphery. The paper from roll 27 is then taken a turn or two around the tire shoe between the pairs of flanges 36 and 43, and the power of driving pulley 6 imparted to shaft 5 and its driven parts by depressing foot lever 8 to the position shown in Figs. 1 and 2, which forces friction clutch into driving contact with said pulley 6. The motion thus imparted to shaft 5 is communicated to friction wheel 9 to rotate the shuttle rapidly in the direction of the arrow in Fig. 1, thus carrying the paper roll 27 around said tire shoe to wrap the same, and is also communicated, through worms 33 and worm gears 32 to shafts 31, sleeves 34 and the flanges 36 and 43, so that the tire shoe mounted and held between said flanges will be rotated slowly in the direction of the arrow in Fig. 2 to feed said tire shoe at the speed necessary properly to receive the paper in spiral form.

The object in slightly staggering the position of the pairs of flanges 36 and 43, as best seen in Fig. 3, where the line of disposition of the tire shoe is indicated by the dotted line *x*, is to dispose the tire shoe being wrapped axially in the line of the spiral wrapping, so that there will be no puckering or fullness to the wrappings of the paper as there would be if the tire shoe were disposed at a right angle to the length of the machine while being wrapped.

The texture of the paper used for this wrapping is such that no considerable strain can be imposed thereon without danger of breaking the paper web. It is to effect a comparatively tight wrap without imposing a breaking strain on the paper during the wrapping operation that the movable flanges 43 are employed, as the same by compressing the beads of the tire shoe toward each other at the point of wrap, as shown by the dotted line position in Fig. 7, permit the paper to be wrapped thereon in a comparatively loose manner, the expansion of the beads toward their normal position as the wrapped portion of the tire shoe passes beyond the flanges 36 and 43 causing the spiral wrapping to be tautened, and thus providing a comparatively tight wrap without undue tension or strain on the paper web during the wrapping operation.

Having thus described my invention, what I claim as new and desire to secure by Letters Patent is:

1. A machine of the class described, comprising means adapted to directly engage the inner periphery of a tire to afford a support therefor; means for feeding the tire; means for engaging the beads of the tire spaced in fixed positions when in operative engagement for contracting the beads a fixed amount from the normal, whereby the sides of the tire are brought under tension; a source of supply for the wrapper, and means for revolving said source of supply about the path of the tire.

2. In a machine for wrapping tire shoes, a shuttle having an opening therein to adapt the tire to be threaded therethrough, supports for the tire, means for rotating one of said supports to feed the tire, means for holding together unyieldingly the beads of tires of different sizes, said holding means being out of alinement for positioning the tire in a plane oblique to that of said shuttle.

3. In a machine of the class described, a ring shuttle, means for rotating said ring shuttle, a support for the tire adapted to be rotated, means for actuating said support and means for unyieldingly forcing together the beads of the tire at the point of wrapping, said holding means being out of alinement for positioning the tire in a plane oblique to that of said ring shuttle.

4. In a machine for wrapping tire shoes, a ring shuttle within which the tire shoe is threaded, means for rotating said ring shuttle, parallel supports upon which the tire shoe rests when threaded within said ring shuttle, means for rotating said supports to feed said tire shoe, fixed flanges on said supports for engaging the bead on one side of the tire shoe, and adjustable flanges on said supports for engaging the bead on the other side of said tire shoe to force said beads together at the point of wrap from said ring shuttle.

5. In a machine for wrapping tire shoes, a ring shuttle within which the tire shoe is threaded, means for rotating said ring shuttle, parallel sleeves upon which said tire shoe rests when threaded within said ring shuttle, means for rotating said sleeves to feed said tire shoe past the point of wrap from said shuttle, fixed flanges on said sleeves against which one bead of the tire shoe contacts, flanges carried by said sleeves and adjustable longitudinally thereof to engage the other bead of the tire and force said beads toward each other, and a common means for operating said adjustable flanges.

6. In a machine for wrapping annular tire casings and the like, the combination of an incomplete annular housing, an annular shuttle having an opening for the passage of a tire casing therethrough, means for rotatably supporting the shuttle within the housing, means for supporting within said shuttle the tire casing to be wrapped, means for turning said shuttle and tire casing at predetermined relative rates, a roll of wrapping material rotatably mounted on the shuttle, and means for pressing together the two edges of the tire casing adjacent to the point at which the wrapping material is being applied thereto.

In testimony whereof I have hereunto set my hand in the presence of two subscribing witnesses.

THOMAS MIDGLEY.